United States Patent [19]
Novotny

[11] 3,901,122
[45] Aug. 26, 1975

[54] VARIABLE EXPANSION COMPRESSION NUT AND BOLT ASSEMBLY

[75] Inventor: Rudolph J. Novotny, North Palm Beach, Fla.

[73] Assignee: United Aircraft Corporation, Hartford, Conn.

[22] Filed: Oct. 3, 1973

[21] Appl. No.: 403,241

[52] U.S. Cl. ................................. 85/32 T
[51] Int. Cl.² ................... F16B 29/00; F16B 37/00
[58] Field of Search ............ 85/32 T, 32 R, 62, 1 T, 85/61; 151/21 C

[56] References Cited
UNITED STATES PATENTS

| | | | |
|---|---|---|---|
| 2,059,853 | 11/1936 | Daiber | 85/32 T |
| 2,870,668 | 1/1959 | Flahaut | 85/32 T |
| 2,940,495 | 6/1960 | Wing | 151/21 B |
| 3,742,808 | 7/1973 | Trembley | 85/32 R |

FOREIGN PATENTS OR APPLICATIONS

| | | | |
|---|---|---|---|
| 824,012 | 11/1959 | United Kingdom | 85/32 T |

*Primary Examiner*—Ramon S. Britts
*Attorney, Agent, or Firm*—Jack N. McCarthy

[57] ABSTRACT

A nut and bolt assembly is shown retaining members together in which the nut is a variable expansion compression nut. The nut has an internally threaded portion with an external portion located thereover of reduced diameter having a spring rate of such a value with respect to the spring rate of the cooperating bolt that the nut and bolt will deflect in a cooperating manner to improve bolt loading. The end of the nut adjacent the members being held has means thereon rotating the nut and the other end of the nut is tapered outwardly to increase the area from the reduced portion to an enlarged section which provides a rigid hoop.

This invention herein described was made in the course of or under a contract with the Department of the Air Force.

11 Claims, 2 Drawing Figures

VARIABLE EXPANSION COMPRESSION NUT AND BOLT ASSEMBLY

BACKGROUND OF THE INVENTION

Other means whose use attempts to accomplish a similar result includes tension nuts, variable pitch thread nuts, and conical pitch diameter nuts. Some tension nut patents are as follows: U.S. Pat. No. 1,978,229, U.S. Pat. No. 2,005,348 and U.S. Pat. No. 2,059,853.

SUMMARY OF THE INVENTION

A primary object of the present invention is to provide a high load capacity nut that will distribute the bolt load more uniformly to all of the bolt threads, thereby preventing failure in the first engaged threads of the bolt.

In accordance with the present invention, a bolt assembly is provided wherein a variable expansion compression nut has a reduced external diameter portion having internal threads which have an axial spring rate related to the spring rate of the bolt having mating external threads to permit the nut and bolt to deflect in a cooperating manner to load the bolt more uniformly.

Another aspect of the invention is to provide a variable expansion compression nut having a reduced external diameter portion extending over a length of at least two to three threads to permit the nut to expand at the first engaged threads of the bolt. In addition, because of the compressive loading, the nut expansion is amplified, aiding the relaxation of bolt load in the first engaged bolt threads. The present invention also includes an enlarged portion at the free end of the nut to reduce axial and radial nut deflection to maintain these relative sizes of the nut and bolt at this location.

Means to rotate the nut are placed around the nut between the reduced portion and the washer face mating with the retained member. This invention permits a bolt and nut combination to bury the first thread of the bolt and have it located adjacent the end of the reduced portion which is adjacent the washer face of the nut. Knowing the width of the members to be retained, the relative size and proportion of the bolt and nut are controlled to achieve this result.

DESCRIPTION OF THE PREFERRED EMBODIMENT

Figure 1:
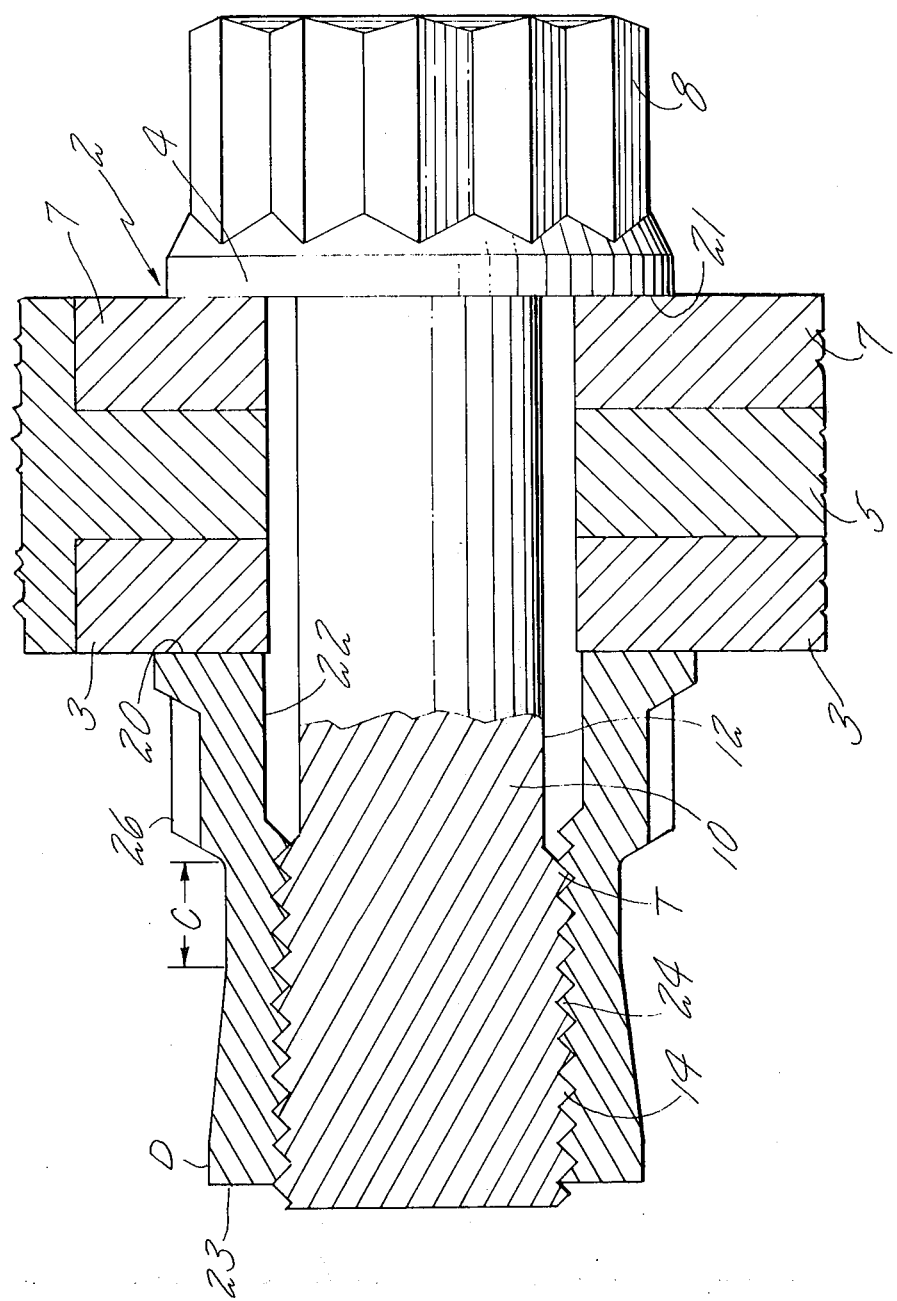
FIG. 1 is a cross-sectional view taken through a bolt and variable expansion compression nut holding three members together.

Referring to FIG. 1 a bolt assembly 2 is shown comprising a bolt 4 and a nut 6 with the bolt assembly holding three members 3, 5 and 7 together. The bolt 4 is a conventional bolt having a 12-point head 8, for receiving a wrench or other turning device, with a stem 10 having a shank 12 with a threaded section 14 at the free end thereof. The nut 6 is a variable expansion compression nut having a washer face 20 for engaging the surface of member 3 being held thereby. The members 3, 5 and 7 are held between the washer face 20 of the nut 6 and the surface 21 on the head 8 of the bolt 4.

An opening extends through the nut comprising a straight counter-sunk portion 22 extending from the washer face 20 and an internally threaded portion 24 extending from said counter-sunk portion 22 to the end face 23 of the nut. On its external surface the nut 6 has a 12-point head 26 adjacent the washer face. A reduced section C is located in the center portion thereof, adjacent the 12-point head 26, with the remainder of the nut being tapered outwardly, thereby having its area enlarged outwardly, to an enlarged end portion at D.

The internally threaded portion 24, which extends from the bottom of the counter-sunk portion 22, has its first thread located axially toward the washer face 20 from a point located radially inwardly from the beginning of the reduced section C adjacent the 12-point head 26. This construction permits the first thread T of the threaded section 14 of the bolt 4 to be buried when it reaches the plane passing through the end of the reduced section C located adjacent the 12-point head 26. The length of the bolt stem 10 is made of such a value for a particular use so that the first thread T of the threaded section 14 of the stem 10 will engage the threads of threaded portion 24 in a plane falling within the first part of the reduced section C of the variable expansion compression nut 6 in a hand-tight condition. For example, knowing the total width of the members to be retained as one inch; if the distance from the washer face 20 to the adjacent end of the reduced section C is made one-half inch, then the first thread T of the bolt should be located approximately one and one-half inches from the surface 21 of the head 28.

Figure 2:
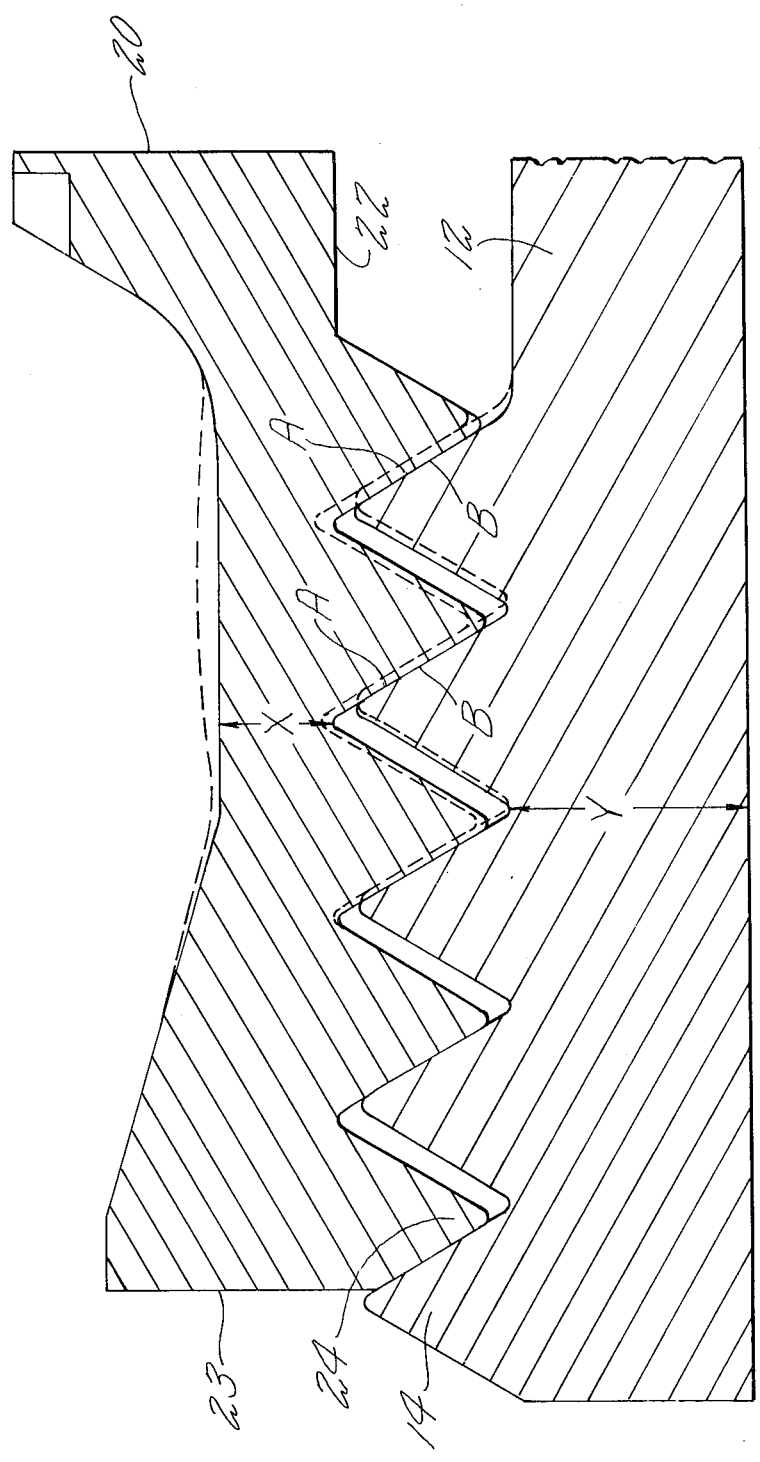
FIG. 2 is an enlarged schematic view of the variable expansion compression nut showing its cooperation with the threaded portion of the bolt.

The reduced section C is reduced to make the spring rate in this section of the nut of such a value with respect to the spring rate of the threaded portion of the bolt stem 10 to permit the nut and bolt to deflect in a cooperating manner to improve the load deflection throughout the length of the threaded section 14 (see FIG. 2). Generally, most nuts place the highest load on the first thread or two of the bolt forcing them to absorb the majority of the deflection and induce early bolt failure. As mentioned hereinbefore from the reduced section towards the end of the nut having a portion of increased area, the cross section of the nut enlarges in a tapered manner to reduce the axial and radial nut deflection. In a construction built the reduced section C had the annular area of the nut indicated by width X made equal to the circular area of the bolt having Y as a radius. This provided the reduced section of the nut with an equal spring rate to the threaded section 14 of the bolt 4. The reduced section C should cover at least a length of from two to three threads. In a construction built approximately three threads were under the reduced section C and an approximate ten percent increase was made in the minimum area of the enlarged end portion D over the minimum area at the reduced section C.

In tightening the bolt assembly on the members 3, 5 and 7, when high torque levels are reached, the surfaces A of the bolt threads cams the surfaces B of the variable expansion compression nut outwardly as shown in FIG. 2 deflecting the nut outwardly in the area of the reduced section. This permits relief of thread loading at this point and permits the loading to increase outwardly in an axial direction to each successive thread to where the nut has been increased in area to provide greater resistance to outward deflection. The compressive loading in the nut amplifies this camming action to relieve the load in the first bolt threads.

I claim:

1. A variable expansion compression nut having inner and outer surfaces with first and second ends, the first end of the nut including a rigid washer portion providing a washer face for engaging a member to be held while the second end provides a rigid hoop, said outer surface being contoured to place a reduced diameter therearound having a substantially cylindrical thin wall section between the first and second ends, the thin wall section being of less outer diameter than either of said first and second ends and being the thinnest wall section between the first and second ends, said inner surface having a threaded portion extending inwardly from the end providing a rigid hoop, said inner surface having an unthreaded portion extending inwardly from the washer face of the other end, said thin wall section having at least a length of substantially two threads of the threaded portion of said inner surface, said threaded portion and said unthreaded portion meeting at a point on the inner surface of said nut with the first inner thread of said threaded portion being located so that it is radially aligned with and will be engaged within the reduced diameter of the thin wall section whereby the nut is deflected outwardly in the thin wall section upon loading of the threads of the threaded portion.

2. A combination as set forth in claim 1 wherein the outer surface tapers outwardly from the substantially cylindrical thin wall section of reduced diameter towards the first end of the nut including the washer face.

3. A combination as set forth in claim 1 wherein the outer surface tapers outwardly from the substantially cylindrical thin wall section of reduced diameter towards the first end of the nut including the washer face and the outer surface tapers outwardly from the substantially cylindrical thin wall section of reduced diameter towards the rigid hoop.

4. A combination as set forth in claim 1 wherein means for turning the nut are placed on the outer surface between the section of reduced diameter and the washer face.

5. A combination as set forth in claim 1 wherein the outer surface tapers outwardly from the substantially cylindrical thin wall section of reduced diameter towards the rigid hoop.

6. A combination as set forth in claim 1 wherein the cross-sectional area of the nut at the rigid hoop is approximately 10% greater than the cross-sectional area of the section of reduced diameter.

7. A combination as set forth in claim 1 where the first inner thread of said threaded portion will be engaged within the reduced diameter adjacent the end nearest the washer face.

8. A variable expansion compression nut having inner and outer surfaces with first and second ends, the first end of the nut including a rigid washer portion providing a washer face for engaging a member to be held while the second end provides a rigid hoop, said outer surface being contoured to place a section of reduced diameter therearound having a substantially cylindrical thin wall section between the first and second ends, the thin wall section being of less outer diameter than either of said first and second ends and being the thinnest wall section between the first and second ends, said inner surface being threaded, said thin wall section having at least a length of substantially two threads of the threaded inner surface, a bolt, said bolt having an enlarged head on one end and a threaded section on the other with an unthreaded section therebetween, said unthreaded section of said bolt being of a diameter so as to permit engagement of said threaded surface of said nut and the threaded section of the bolt, said unthreaded section of said bolt being made a predetermined length so that in use for holding members together having a predetermined thickness the first thread of said bolt nearest the head thereof engages the threaded section of said nut at a point within the reduced diameter on the inner surface of said nut in radial alignment with said substantially cylindrical thin wall section to deflect the nut outwardly in the area of the reduced section permitting the loading of the threads to increase outwardly in an axial direction towards the rigid hoop.

9. A combination as set forth in claim 8 wherein the spring rate of the section of reduced diameter of the nut is of a predetermined value with respect to the spring rate of the bolt so that the nut and bolt will deflect with relation to each other to improve bolt loading.

10. A combination as set forth in claim 8 wherein the spring rate of the section of reduced diameter of the nut is approximately equal to the spring rate of the bolt so that the nut and bolt will deflect with relation to each other to improve bolt loading.

11. A combination as set forth in claim 8 wherein the minimum area of the section of reduced diameter of the nut is approximately equal to the minimum area of the threaded section of the bolt.

* * * * *